(12) United States Patent
Gillenberg et al.

(10) Patent No.: US 7,588,615 B2
(45) Date of Patent: *Sep. 15, 2009

(54) FILTER ELEMENT WITH DRAINAGE TUBE

(75) Inventors: Eric Gillenberg, Speyer (DE); Wolfgang Heikamp, Waldsee (DE); Melanie Hirsch, Speyer (DE); Otto Eppel, Speyer (DE); Sandra Poelloth, Maikammer (DE); Hans-Michael Winter, Dudenhofen (DE)

(73) Assignee: Mann & Hummel GmbH, Ludwigsburg (DE)

( * ) Notice: Subject to any disclaimer, the term of this patent is extended or adjusted under 35 U.S.C. 154(b) by 412 days.

This patent is subject to a terminal disclaimer.

(21) Appl. No.: 11/363,471

(22) Filed: Feb. 28, 2006

(65) Prior Publication Data

US 2006/0201871 A1    Sep. 14, 2006

(30) Foreign Application Priority Data

Feb. 28, 2005    (DE) .............. 10 2005 009 680

(51) Int. Cl.
*B01D 46/00* (2006.01)
(52) U.S. Cl. .............. 55/423; 55/498; 55/510; 55/DIG. 17
(58) Field of Classification Search .............. 55/447, 55/385.3, DIG. 19, 426, 395, 398, DIG. 17, 55/423, 510, 498; 123/198 E, 573; 96/189; 210/95, 232, 455
See application file for complete search history.

(56) References Cited

U.S. PATENT DOCUMENTS

| | | | | |
|---|---|---|---|---|
| 2,934,166 A | * | 4/1960 | Van Rossum | 55/355 |
| 3,876,400 A | * | 4/1975 | Frantz | 96/113 |
| 5,617,834 A | * | 4/1997 | Lohr | 123/572 |
| 5,899,667 A | * | 5/1999 | Greer | 417/53 |
| 6,234,154 B1 | * | 5/2001 | Spix | 123/572 |
| 6,409,804 B1 | * | 6/2002 | Cook et al. | 95/273 |
| 6,453,892 B1 | * | 9/2002 | Plunkett et al. | 123/572 |
| 6,475,255 B1 | * | 11/2002 | Walker, Jr. | 55/315 |
| 6,500,243 B2 | * | 12/2002 | Cook et al. | 96/189 |

(Continued)

FOREIGN PATENT DOCUMENTS

| | | |
|---|---|---|
| EP | 0 310 407 A2 | 4/1989 |
| WO | WO 03/002233 A2 | 1/2003 |

OTHER PUBLICATIONS

European Search Report dated Jun. 14, 2006 including an English translation of the pertinent portions (Six (6) pages).

*Primary Examiner*—Duane Smith
*Assistant Examiner*—Minh-Chau T Pham
(74) *Attorney, Agent, or Firm*—Crowell & Moring LLP

(57) ABSTRACT

A filter element for separating a liquid from a gas stream, e.g. for de-oiling compressed air produced by an oil lubricated compressor, including an annularly closed filter medium and upper and lower end disks at the axial end faces of the annular filter medium, in which the lower end disk closes off an interior space formed by the filter medium, and a drainage tube extends into the interior space and is guided at the upper end disk by a preferably conical sealing element mounted on a support plate on the upper end disk such that when the filter element is installed in a container, the sealing element fits against and forms a seal with a cover of the container. The sealing element optionally has a hollow interior to facilitate compensation of tolerances in at least one of the x-direction and the y-direction.

5 Claims, 2 Drawing Sheets

U.S. PATENT DOCUMENTS

| | | | |
|---|---|---|---|
| 6,530,367 B2 * | 3/2003 | Akiwa et al. | 123/572 |
| 6,591,820 B2 * | 7/2003 | Kitano et al. | 123/572 |
| 6,797,025 B2 * | 9/2004 | Linnersten et al. | 55/319 |
| 7,059,311 B2 * | 6/2006 | Prasad | 123/573 |
| 7,097,683 B2 * | 8/2006 | Eppel et al. | 55/423 |
| 2003/0110743 A1 * | 6/2003 | Stegmaier et al. | 55/337 |

* cited by examiner

FILTER ELEMENT WITH DRAINAGE TUBE

BACKGROUND OF THE INVENTION

The present invention relates to a filter element for separating a liquid, particularly an air deoiling element, having a drainage tube through which the separated liquid can be removed.

The invention also relates to a drainage device that contains such a drainage tube and to a filter apparatus provided with such a drainage tube.

Filter elements with drainage tubes are available in the prior art. They are used, for example, to de-oil compressed air in compressed air systems supplied by an oil-lubricated compressor. Another possible application for such filter elements is the de-oiling of crankcase gases from an internal combustion engine.

In annular filter elements in which the gas flows from the inside radially outwardly toward the outside, liquid separated from the gas collects in the interior of the preferably cylindrical filter cartridge. From there it is withdrawn by suction through a drainage tube, which extends into the interior of the filter cartridge. This drainage tube may be an integral component of the upper end disk of the filter element, so that it is possible to fix it in the position necessary for separated oil to be withdrawn by suction. However, the manufacture of a filter element with firmly mounted drainage tube is complicated, so that the filter element is not economical.

SUMMARY OF THE INVENTION

It is an object of the present invention to provide an improved filter element with a drainage tube.

Another object of the invention is to provide a filter element with a drainage tube which is cost-effective to manufacture.

These and other objects are achieved in accordance with the present invention by providing a filter element for separating a liquid from a gas stream, said filter element comprising an annularly closed filter medium and upper and lower end disks provided at the axial end faces of the annular filter medium, wherein the lower end disk closes off an interior space formed by the filter medium, and a drainage tube is provided which extends into the interior space; and wherein the drainage tube is guided at the upper end disk by a sealing element, such that when the filter element is installed in a container, the sealing element fits against and forms a seal with a cover of the container.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
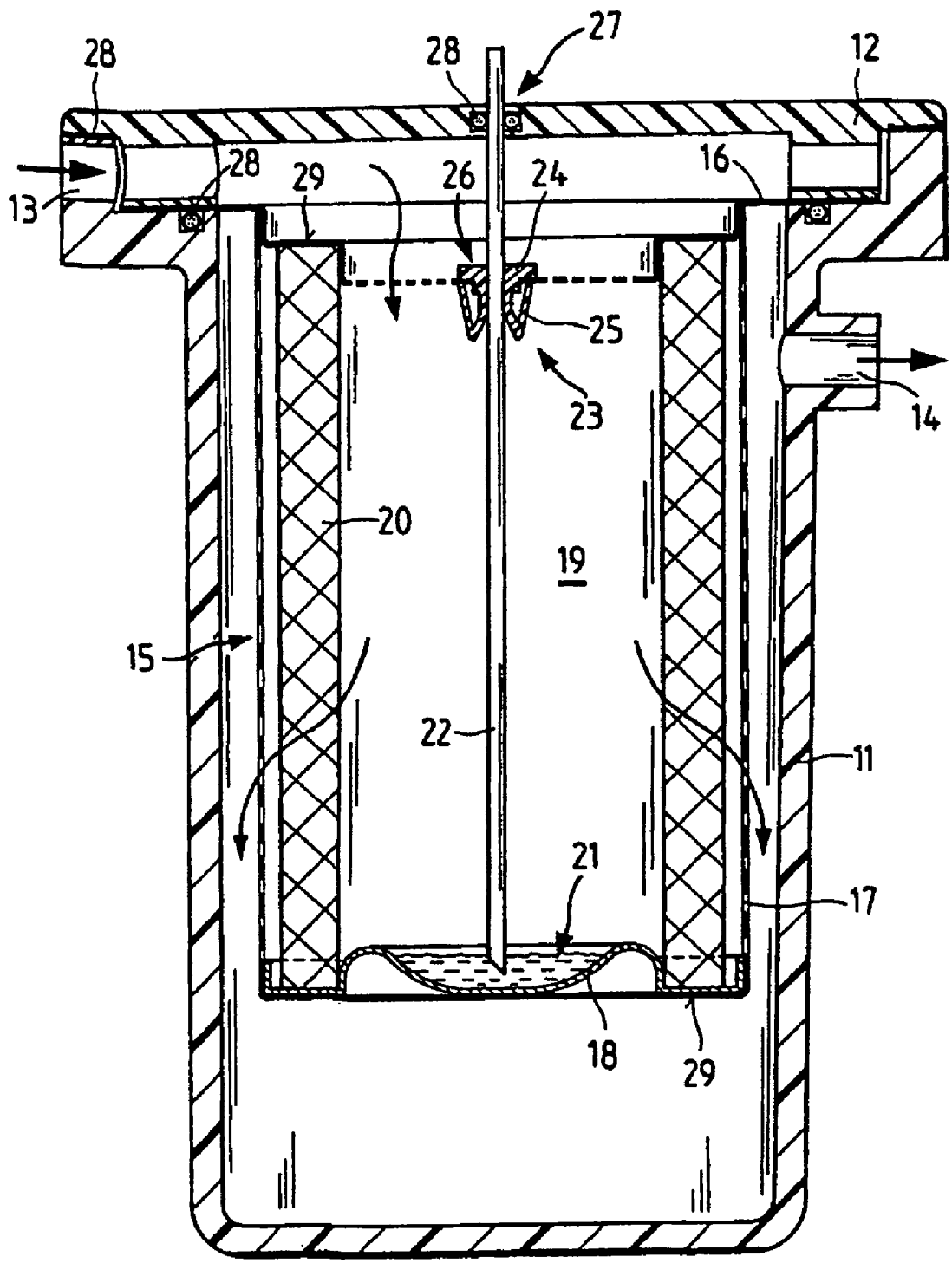
FIG. 1 is a section through the center of a filter device according to the invention.

The filter apparatus depicted in FIG. 1 comprises a housing 11 with a cover 12. Housing 11 is formed with an inlet 13 and an outlet 14 for the fluid to be filtered, particularly a gas. A filter element 15 with an upper end disk 16 is held by a clamped joint between the housing 11 and the cover 12. The filter element 15 further comprises a support member 17 and a lower end disk 18.

Arrows indicate the path of the gas to be filtered. This path extends from the inlet 13 through openings 116 in the upper end disk 16 into an interior chamber 19 of the filter element 15, from where the gas stream is guided through a filter medium 20 and the likewise permeable support member 17 to the outlet 14. The separated liquid collects in a depression 21 in the lower end disk 18 and is withdrawn from the interior space 19 through a drainage tube 22.

The drainage tube 22 forms part of a drainage apparatus 23, which comprises, among other elements, a connecting element 24 with snap-in projections 25. The connecting element 24 is constructed as a stopper-shaped component insertable into a hole-shaped seat 26 in the end disk 16. The connecting element 24 is disposed on the drainage tube 22 and bonded to the tube. Sealing rings 28 are used both to seal the drainage tube at a passage 27 through the cover 12 and to provide a seal between the cover 12 and the housing 11. The filter medium is sealed by bonding its axial end faces 29 in corresponding recesses in the upper and lower end disks 16 and 18.

Figure 2:
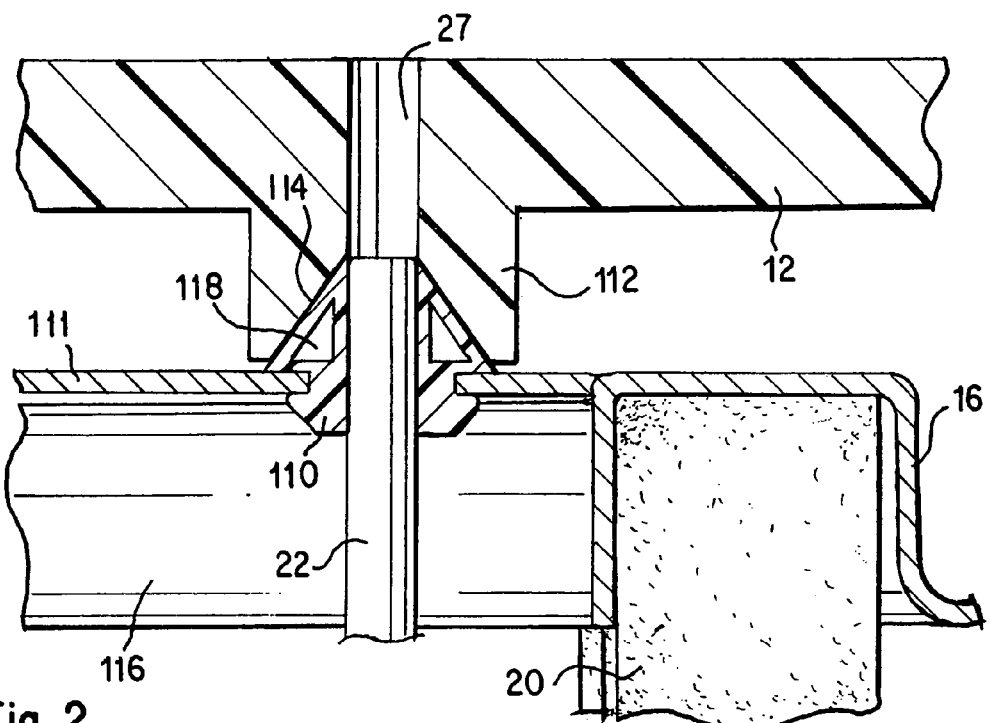
FIG. 2 is a partial sectional view of an illustrative embodiment in which only the seal between the cover and the drainage tube is visible.

FIG. 2 shows an embodiment in which a connecting fitting or nipple 112 for a drainage tube is provided on the cover 12. The connecting fitting 112 has a conically configured recess 114 facing in the direction of the drainage tube which communicates with the passage 27 through cover 12. A conically configured seal 110 is provided extending into this conical recess 114. The seal 110 is attached to a mounting plate or web 111 on the upper end disk 16 which extends across the central opening 116 in end disk 16 and divides the opening into two semicircular openings. Optionally the seal 110 may have a hollow interior construction 118.

Figure 3:
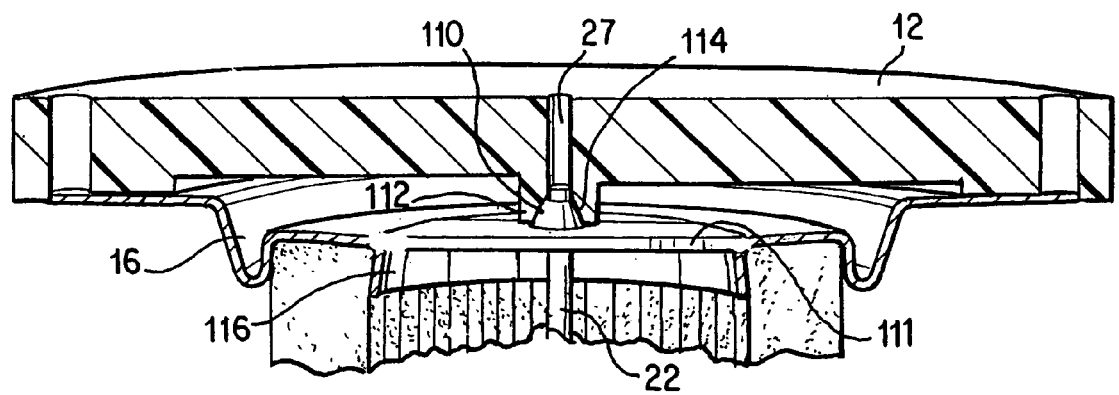
FIG. 3 is another perspective view of the arrangement shown in FIG. 2.

FIG. 3 is a perspective sectional view of the embodiment depicted in FIG. 2. It may be seen that the seal 110 ensures a reliable seal between the drainage tube 22 and the cover 12. In addition, the hollow construction and conical configuration of the seal 110 facilitate compensation of tolerances in both x-direction and the y-direction.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter element for separating a liquid from a gas stream, said filter element comprising an annularly closed filter medium and upper and lower end disks provided at the axial end faces of the annular filter medium, wherein the lower end disk closes off an interior space formed by the filter medium, and a drainage tube is provided which extends into the interior space; and wherein the drainage tube is guided at the upper end disk by a sealing element, such that when the filter element is installed in a container, the sealing element fits against and forms a seal with a cover of the container.

2. A filter element according to claim 1, wherein the sealing element is a conical seal, which is inserted into a conical opening of the cover.

3. A filter element according to claim 1, wherein the sealing element is fastened to a holding plate.

4. A filter element according to claim 1, wherein the sealing element has a hollow interior to facilitate compensation of tolerances in at least one of the x-direction and the y-direction.

5. A filter element according to claim 1, wherein said filter element is an air de-oiling element.

* * * * *